United States Patent [19]

Nogaki

[11] 4,310,144
[45] Jan. 12, 1982

[54] VALVE DRIVE MEANS FOR BACKWASH FILTER VALVES

[76] Inventor: Hisami Nogaki, 13316 Felson Pl., Cerritos, Calif. 90701

[21] Appl. No.: 111,376

[22] Filed: Jan. 11, 1980

[51] Int. Cl.³ .......................... F16K 31/04; F16H 1/18
[52] U.S. Cl. ................................ 251/134; 74/424.8 R; 74/424.8 VA; 192/141; 192/143
[58] Field of Search .............................. 251/134, 284; 74/424.8 R, 424.8 VA; 192/141, 143

[56] References Cited

U.S. PATENT DOCUMENTS

| | | | |
|---|---|---|---|
| 2,483,322 | 9/1949 | Miller et al. | 251/134 X |
| 2,930,571 | 3/1960 | Vogl | 251/134 X |
| 3,080,952 | 3/1963 | Carlstedt | 74/424.8 VA |
| 3,700,085 | 10/1972 | Balz | 192/141 |
| 4,000,663 | 1/1977 | Tyler | 251/134 X |

*Primary Examiner*—Arnold Rosenthal
*Attorney, Agent, or Firm*—I. Morley Drucker

[57] ABSTRACT

This invention is directed to a valve drive means for a vertical up-down valve of the type having a valve shaft linearly movable within a cylindrical valve bore between a first, normal, valve position and a second, occasional valve position. The drive means includes a vertical rotatable drive shaft with a threaded portion formed between non-threaded portions and a mateably threaded coupler for engaging the drive shaft and transmitting axial force to the valve shaft. The movement of the valve shaft is precisely limited by disengagement of the coupler from said threaded drive shaft portion irrespective of continued rotation of said drive shaft. Means are included for neutralizing hydraulic pressure which would interfere with re-engagement of the coupler with the threading on the drive shaft. Means are also preferably provided for deriving a torque component for rotating said valve shaft within said bore and thus facilitating any "freezing" of seal rings mounted to said valve shaft within said valve bore.

24 Claims, 15 Drawing Figures

VALVE DRIVE MEANS FOR BACKWASH FILTER VALVES

BACKGROUND OF THE INVENTION (a) Field of the Invention

This invention pertains generally to the field of fluid switching valve for selectively directing fluid flow through alternate flow paths and in particular, to drives for actuating up-down slide valves in filter backwash system or in fluid flow switching in solar collector systems, among many possible applications.

(b) Description of the Prior Art

Various types of switching valves are widely used to control fluid flow through filter media, e.g., sand media filters in swimming pool installations, in various industrial installations as well as for controlling direction of fluid flow in solar heating fluid circuits. The valves in use include both manually activated valves as well as motor driven valves provided with automated controls of varying complexity.

Particularly common are the so-called "slide-up-down valves" or vertical backwash valves. These relatively simple and economical devices generally comprise a cylindrical metallic or plastic valve body defining a cylindrical bore with a plurality of ports formed in the cylinder wall. A coaxial shaft axially movable within the valve bore, carries two, three, or more discs provided with O-ring seals for partitioning the valve bore at selected points into chambers having various ports; these chambers then permit fluid flow between selected pairs of ports. The shaft carrying the sealing O-rings is axially movable between two positions, each position establishing a different set of interconnections between the ports, and can thus achieve a flow switching action by sliding the valve shaft from one position to the other.

Originally, up-down slide valves were manually operated. This is often a slow and tedious task because the seal rings tend to adhere to the wall of the valve bore when the valve is left in its normal flow position for prolonged periods of time and, during which mineral deposits tend to form within the valve bore making it difficult to dislodge the O-rings and move the valve shaft of the slide valve.

Various attempts have been made to construct motor driven switching valves of this type. While such units have been marketed, none have proved entirely satisfactory in performance, reliability and economy.

The valve drive means disclosed by this specification provides a reliable and economical mechanism of simple construction and effective operation which has been found superior to those known in the past. The valve drive means disclosed herein may be quickly and easily attached to many existing up-down valves for conversion from manual to automated operation. Applicant is not aware of any drive means of the prior art suitable for such conversion.

SUMMARY OF THE INVENTION

This invention relates to a drive means for a vertical up-down valve having a shaft with one or more seal rings affixed thereto, said shaft being axially movable within a cylindrical valve bore between a first, normal valve position and a second, occasional valve position. The drive means comprises a threaded rotatable vertical drive shaft coupled to said vertical valve shaft for exerting axial force thereon by threaded coupler means to thereby move said valve shaft. The drive shaft comprises an upper and a lower non-threaded portion, said threading being formed on a drive shaft portion intermediate said non-threaded portions and corresponding in length to the desired linear movement of said valve shaft between said normal and said occasional valve positions to thereby precisely limit said axial movement of said valve shaft by disengagement of said threaded coupler from said threaded portion irrespective of continued rotation of said drive shaft.

The valve drive further comprises spring means urging said coupling onto said threaded drive shaft upon disengagement of said coupling from said threading at one or both of the upper and lower non-threaded portions. Preferably, a floating coupling and upper and lower stop means are provided to restrain axial valve shaft movement and neutralize hydraulic pressure in the valve bore which would otherwise operate to prevent reengagement of the coupling with the threading on the drive shaft. The drive of this invention may also comprise means connected to said valve shaft for deriving a torque component from said axial force to thereby rotate said valve shaft and said one or more seal rings within said valve bore to thereby reduce the coefficient of friction between said one or more seal rings and said valve bore, whereby less force is required for the dislodging of any "frozen" sealing rings and for said axial displacement.

In a first embodiment the coupler engages the drive shaft colinearly with the valve shaft, while in a second disclosed embodiment, the drive shaft and the valve shaft are radially offset from each other and the coupler is transversely connected therebetween.

BRIEF DESCRIPTION OF THE DRAWINGS

FIG. 13 illustrates an alternative waveshaped guide slot for obtaining oscillatory rotation of the valve shaft in the embodiment of FIG. 3a.

DETAILED DESCRIPTION OF THE PREFERRED EMBODIMENT

Figure 1:
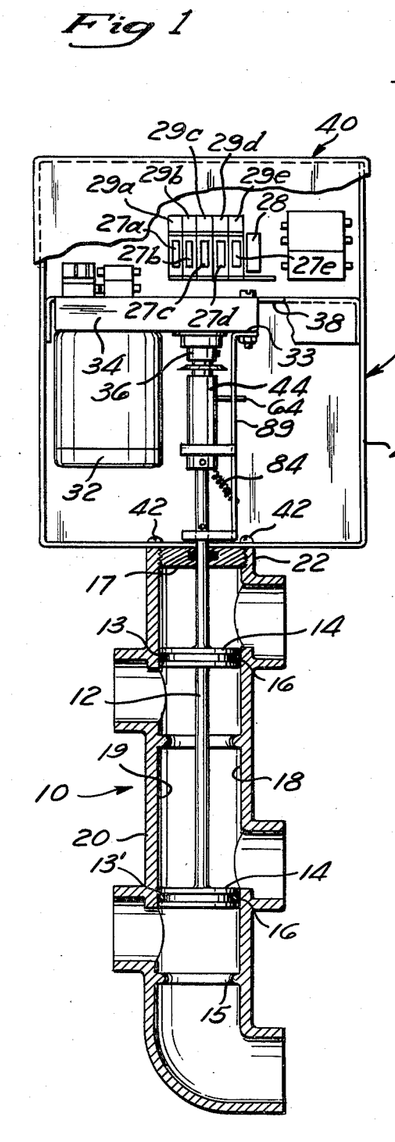
FIG. 1 is an elevational cross section of a typical vertical up-down valve with a first embodiment of the valve drive means of this invention shown coupled thereto, the valve being shown in the up position.

Referring to FIG. 1 of the drawings a standard vertical up-down slide valve 10 has a valve shaft 12 provided with a pair of discs 14 to each of which is affixed an O-ring rubber or plastic sealing member 16. Shaft 12 is axially movable within the cylindrical bore 18 of valve body 20 between a normal valve position and an occasional valve position as will be explained.

Mounted to the upper end 22 of the valve body 20 is a motor drive means generally designated by the number 30 which comprises a preferably electric motor 32 driving a conventional reduction gear train 34 provided with an output shaft collar 36. The motor drive means 30 is secured by means of bracket 38 to enclosure 40, yielding a unitary drive module which is readily attachable to valve body 20 by means of threaded screws 42, and can be quickly detached in the event of malfunction.

Figure 2:
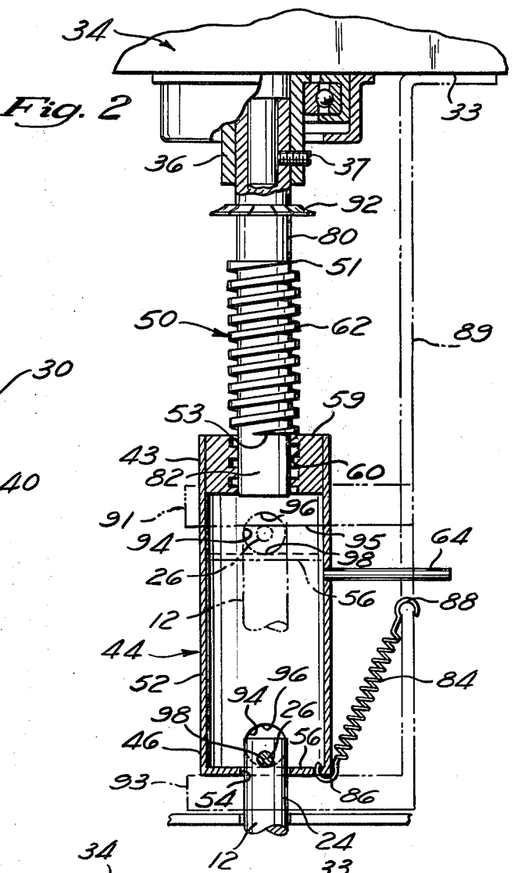
FIG. 2 is an enlarged view in partial cross-section of the drive coupling means of FIG. 1 showing the coupler pulling the valve shaft from its down position toward the up position of the valve shaft (the up position being shown in phantom)
Figures 3, 9A:
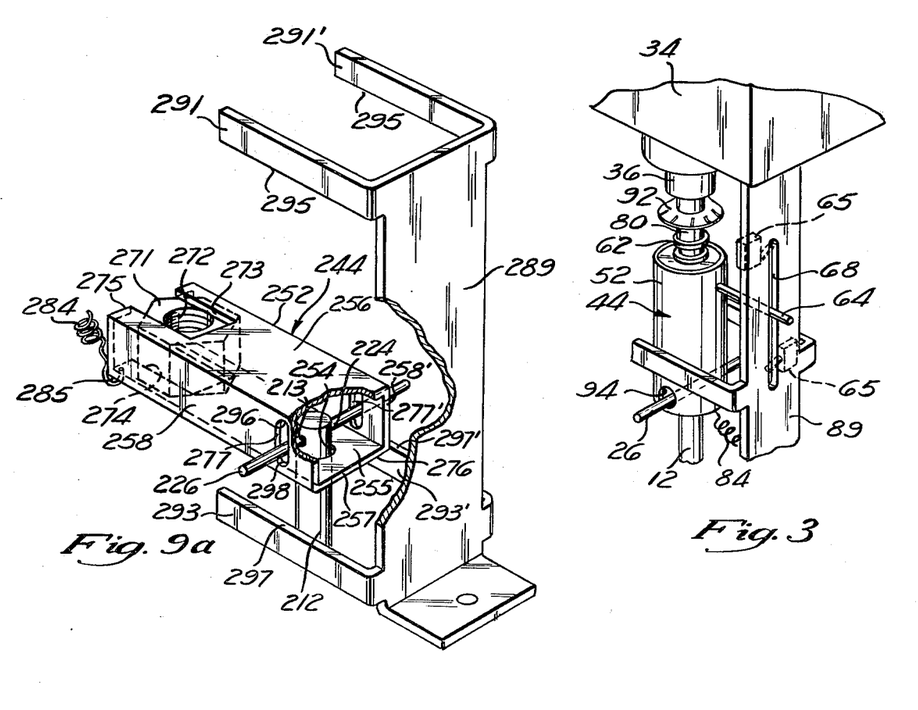
FIG. 3 is a perspective view of the drive coupling means of FIG. 2.
FIG. 9a is an enlarged partially broken away perspective of the radial shaft coupler of FIG. 8 showing the floating connection with the valve shaft and the bracket providing the upper and lower stop means.

Turning now to FIGS. 2 and 3, a partially threaded drive shaft 50 is affixed to the gear train output shaft collar 36 by means of set screw 37. Drive shaft 50 engages the upper end of a colinear, cylindrical, coupler 44, the lower end 46 of which is secured to the upper end or stem 24 of valve shaft 12, preferably by means of a transverse retaining pin 26.

The coupler 44 comprises, preferably, a hollow tube 52 having an aperture 54 formed in its bottom wall 56 for receiving valve shaft 12. At the upper end 43 of coupler 44 there is provided an internally threaded collar 59 having internally threaded means 60 adapted to mateably engage the threaded portion 62 of the vertical drive shaft 50. Affixed in the upper section of coupler 44 is a laterally extending coupler guide pin 64, the laterally extending end of pin 64 being captive in a guide channel or groove 68 formed in bracket 89, as best seen in FIG. 3. Such a guide means is necessary to restrain the coupler against rotation to obtain exclusively linear displacement of the coupler 44 upon rotation of the drive shaft 50. It is understood that other guide means may be resorted to: for example, if the coupler tube 52 is made of rectangular cross section, the upper and lower arms 91, 91', 93, 93' together with bracket 89 may be adapted to fit closely about the coupler 44 to form a guide channel which will prevent the coupler tube 52 from rotating together with drive shaft 50. Thus, the coupler 44 moves up or down along the drive shaft 50 when the latter is turned by the motor driven output shaft 36. The threaded vertical drive shaft 50 thus exerts an axial force upon the vertical valve shaft 12 to thereby linearly move the latter within the valve bore 18. The direction of movement depends, of course, on the direction of rotation of drive shaft 50.

It will be apparent from the geometry of the valve 10 that the travel limits and positioning of the valve shaft 12 and discs 14 are critical. For example, if the shaft 12 of FIG. 1 is driven downwards too far, the lower disc 14 will contact the valve collar 15 and if the motor 32 continues to run the valve disc 14 is likely to crack the valve body 20. Conversely, if the valve shaft 12 is driven excessively upwards, the upper disc 14 will come against the top wall 17 beyond which travel is no longer possible, causing irreparable damage to the valve 10 or motor drive 30, or to both. Even without such extremes, there is very little leeway at points 13, 13' for correctly positioning the discs 14, in order to make an effective partition of valve bore 18. It is therefore imperative to include a foolproof method for precisely limiting the travel distance of the motor driven valve shaft 12. One method would be to include position sensing microswitches 65, e.g., on bracket 89 as in FIG. 3 at the upper and lower limits of travel of guide pin 64 respectively. Microswitches 65 would then be tripped by a trip member which may be the pin 64 and would be connected in the electric circuit of motor 32 so as to interrupt power thereto to stop the motion of valve shaft 12.

It has been found, however, that some valves are so constructed that the residual inertial motion of the motor 32 and gear train 34, after power is cut off, is sufficient to damage the assembly. Further, no amount of experimentation and repositioning of the micro switches 65 has been of avail because the final resting point of the valve shaft 12 is dependent on a number of variables, such as the amount of wear on the O-ring seals 16, the deposits on the wall of bore 18, etc. For such valve designs, it is necessary to provide more precise and positive means for limiting the travel of the valve shaft 12. To this end, the threading on the drive shaft 50 is limited to an intermediate portion thereof for accurately determining the end of travel positioning of the axial drive shaft 50 by disengagement thereof with the threaded portion 62. When the internally threaded collar 59 of coupler 44 moves onto the smooth, non-threaded upper and lower portions 80 and 82, respectively of drive shaft 50, the coupler thread means 60 disengage from the drive shaft threading 62 and axial movement of the coupler ceases immediately irrespective of continued rotation of the drive shaft 50.

The length of the threaded portion 62 of drive shaft 50 precisely determines the travel distance of the valve shaft between its normal and occasional positions.

A lower spring means preferably a helical coil spring 84 is affixed to the coupler tube 52 as at point 86 and stretches to a suitable anchor point such as point 88 of fixed bracket 89. Lower spring 84 thus urges the coupler 44 upwardly after disengagement has occured at the lower end of travel to prevent the coupler from dropping away and to urge re-engagement of the top end of threading 60 in the coupler collar 59 with the lower end 53 of the drive shaft threading 62 as soon as the rotation of the drive shaft 50 is reversed.

Similarly, an upper spring means such as spring washer 92 is provided at the upper non-threaded portion 80 to urge the coupler tube 52 downwards for re-engagement with the drive threading 62. It has been found that in some cases the upper spring means may be dispensed with inasmuch as gravity will accomplish the same result. It is understood that different spring means can be substituted for the spring means 84, 92 shown in the drawings.

The coupler 44 is only loosely connected to the valve shaft 12 by a transverse retaining pin 26 secured to valve shaft 12 which extends through transversely aligned oversize openings 94 in coupler tube 52. Coupler 44 is free to float, relative to the pin 26 and therefore valve shaft 12, between a fixed upper limit or shoulder 96 and a fixed lower limit or shoulder 98, defined by the rim of the openings 94 and is drivingly engageable with those shoulders 96 and 98 as the coupler tube 52 moves up or down along drive threading 62. Openings 94 are shown to be circular in FIGS. 1–3 but may advantageously be vertical slots such as 277, 277' in FIG. 9a.

Without this loose or floating coupling between coupler 44 and valve shaft 12 the hydraulic pressure inside the valve bore 18 will be transmitted by the valve shaft 12 to the coupler tube 52 so as to exert a force thereon away from the drive threading 62 and will prevent re-engagement of the coupler 44 with the drive threading 62. This effect is best appreciated by reference to the flow diagrams of FIGS. 4 and 5 each showing a valve 100 equipped with a motor drive 102 for moving valve shaft 104 between the up, normal position of FIG. 4, and the down, occasional backwash position of FIG. 5. A fluid, such as water, is drawn from a body of fluid 106 by pump 108, directed into port c of valve 100 and flows out through port b, and then through conduit 110 leading to the inlet side 112 of filter 114. The fluid passes through the filter medium, e.g., sand 116 under pressure and is collected at the outlet side 118. The fluid is then directed by conduit 120 through port d into the bore of valve 100 and exits therefrom through port c from where it is returned through heater 122 to the body of fluid 106, which may be a swimming pool or the reservoir of a cooling tower in a large air conditioning system.

After the fluid has been circulated through the filter medium for a given length of time, debris and impurities will accumulate reducing the efficiency of the filter by clogging and compacting the filter medium and thus increasing the resistance offered to pump 108 which, in turn, increases the energy consumption of pump 108.

The filter 114 is cleared by backwashing it, i.e., occasionally reversing the fluid flow through the filter medium 116 to flush out the matter which tends to accumulate the inlet side. The backwash cycle involves reversing the fluid flow through conduits 110 and 120 which means that pump 108 must now force fluid into the outlet 118 of filter 114, while fluid now collected at inlet 112 must be directed to a drain connected to port a of valve 100. This switching of flow paths is effected by sliding up the valve shaft 104 of FIG. 4. to the position shown in FIG. 5, thus establishing a new set of interconnections between the ports a-e of valve 100. Now, fluid pumped into port c flows out through port d into conduit 120 leading to outlet 118. The fluid then backflows under pressure through the filter medium 116 dislodging debris and decompacting the granular filter medium, is collected at inlet 112, flows through conduit 110 into port b of valve 100 and out through port a into a drain connected thereto. After a given period of time, e.g., ten minutes, the valve shaft is returned to its normal position of FIG. 4 and the system resumes normal filtering operation.

Figure 4:
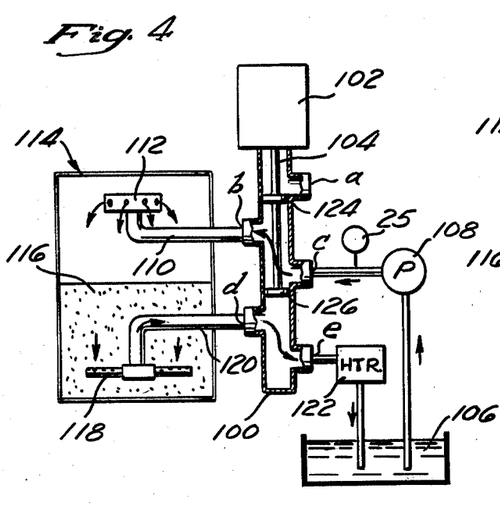
FIG. 4 is a partly schematic flow diagram of the backwash filter system showing the valve means in its normal flow position.
Figure 5:
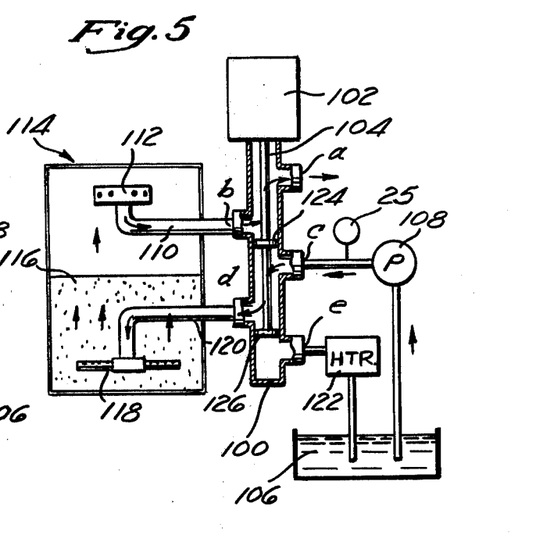
FIG. 5 is a partly schematic flow diagram of the backwash filter system of FIG. 4 showing the valve means in the occasional, i.e., backwash position.

It will be noticed that the fluid flow from pump 108 through valve 100 is such as to exert upward pressure on disc partition 124 when the shaft 104 is in the up position of FIG. 4, and downward fluid pressure on disc partition 126 in the down position of shaft 104, as in FIG. 5.

The same flow patterns occur in the valve 10 of FIG. 1 and the resultant fluid pressures are transmitted through shaft 12 to the coupler 44. Thus, in the shaft down position, the fluid pressure will operate to pull down on the valve shaft 12 and unless valve shaft 12 is restrained, it will pull down on coupler tube 52, preventing re-engagement of thread means 60 with the drive shaft threading 62 at 53 thus disabling the drive mechanism. A similar result would obtain in the shaft up position where upward hydraulic pressure would work against downward re-engagement of thread means 60 at point 51.

It is in preventing this that the loose or floating connection of the shaft 12 and coupler 44 plays an important role in combination with an upper stop means and a lower stop means such as the lower edges 95 of upper arms 91, 91' and upper edges 97 of lower arms 93, 93' projecting from the bracket 89 which is fixed relative to the valve body 20, as by mounting to the reduction gear train 34 at 33 by welding or other fastener means.

The upper stop edges 95 of upper arms 91 and 91' are positioned so as to lie intermediate the upper and lower coupler limits 96, 98, respectively, following disengagement of the coupler 44 from threading 62 at the upper travel limit 51. This positioning of edges 95 is suggested in FIG. 2 with the aperture 94 shown in dotted lines, and more specifically shown in the detail of FIG. 9.

Figures 8, 9:
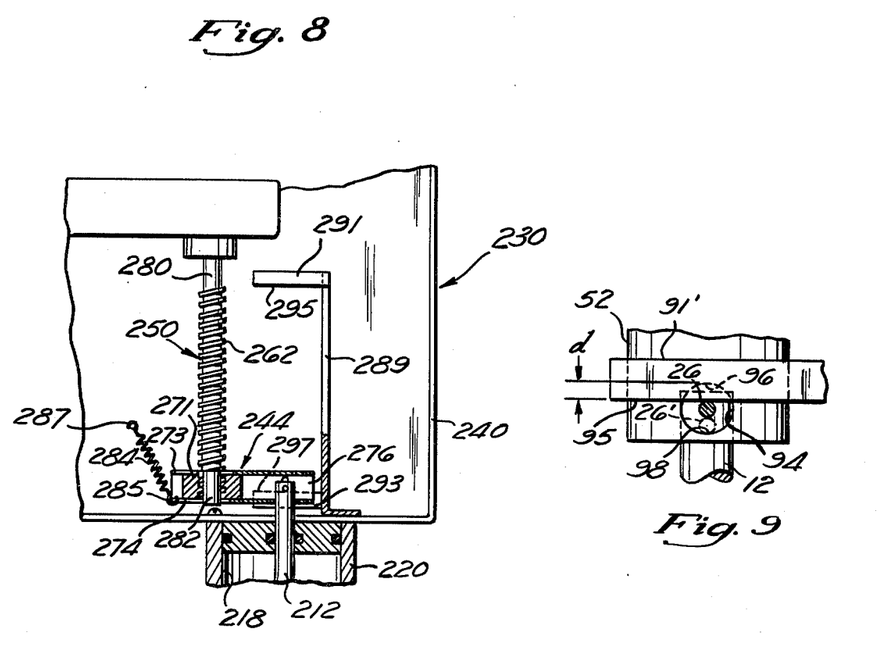
FIG. 8 is a partial side elevational cross section of a second embodiment of the invention showing an offset shaft drive and a radial shaft coupler.
FIG. 9 is an enlarged elevational detail illustrating the positioning of the floating coupling of FIGS. 2 and 3 at the upper stop means.

The sequence of events is: first, the coupler tube 52 is moving upwardly along drive threading 62, during which movement the pin 26 is drivingly engaged by the lower coupler limit 98 and the valve shaft is thus being pulled upwards. Second, the coupler 44 reaches its upper travel limit by disengaging from threading 62 at 51; at this point, the upper coupler limit 96 is located above the upper stop edges 95, but pin 26 has not yet reached edges 95, as shown in FIG. 9 with pin 26' in dotted lining. Finally, when fluid pressure builds up within bore 18 of valve 10 (as by commencing pumping of fluid therethrough) the valve shaft 12 is pushed upwards whereupon the pin 26 comes into stopping engagement with the lower edges 95 as shown by pin 26 in solid lining in FIG. 9. Pin 26 is thus prevented from engaging the upper coupler limit 96 and pushing coupler 44 away from threading re-engagement with drive threading 62 at point 51.

A similar sequence of events (not illustrated in the drawings) takes place during downward movement of shaft 12 by coupler 44, the directions being reversed, of course. Specifically, the lower coupler limit 98 will lie below the lower stop edges 97 after disengagement of coupler threading 62 at point 53. Thus, at the lower travel limit of coupler 44, the lower stop edge 97 will also lie intermediate the upper and lower coupler limits 96, 98, respectively. Pin 26 is thus prevented by stop edges 97 from engaging the lower coupler limit 98 as a result of hydraulic pressures within the valve bore 18 which pressures would act to urge the coupler downwards and away from drive threading 62, preventing re-engagement of coupler 44.

The oversize aligned apertures 94 may be approximately ⅜ to ½ inch in diameter and are formed in coupler tube 52 so that the lower limit 98 defined by each opening 94 will be positioned beneath the edge 97 upon disengagement of coupler threading 60 at the lower end 53 of drive threading 62. Transverse pin 26 will then come to rest on upper edges 97 of the lower arms 93, 93' to hold the valve shaft in suspension within the limits defined by opening 94. The lower stop means 97 thus supports the weight of the valve shaft 12 and also neutralizes the downward hydraulic pressure created by fluid circulating through the valve as has been explained. The coupler 44 does not again come into contact with pin 26 until after re-engagement with threading 62 at 53, which occurs after reversal of rotation of drive shaft 50.

The upper arms 91, 91' perform a similar function in restraining the shaft 12 from upward movement resulting from upward hydraulic pressure acting on valve shaft 12 which would prevent re-engagement of coupler tube 52 with upper end 51 of drive threading 62. This function is illustrated in FIG. 9 where pin 26 in solid lining has been stopped by lower edge 95 of upper arm 91' at a distance d short of the upper coupler limit 96 of coupler tube 52. Thus, upon re-engagement of the coupler threading 60 with drive threading 62, the upper coupler limit 96 defined by opening 94 will have to travel downwards a distance d before it drivingly engages the pin 26 to commence downward displacement of valve shaft 12.

Figure 3A:
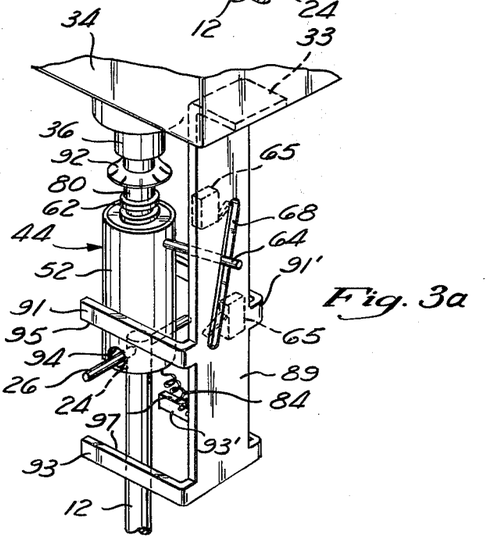
FIG. 3a is a perspective view of a modified drive coupling of FIG. 2 modified by the addition of means for applying a torque component to the coupler.
Figure 13:
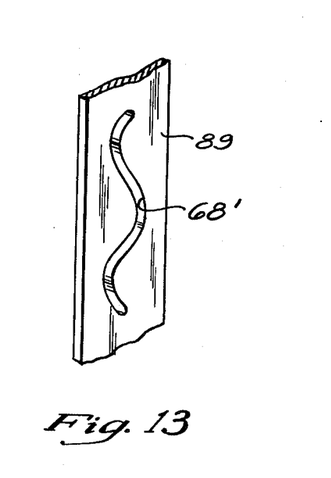

A torque deriving means for the colinear driving coupling of FIGS. 1–3 is shown in FIG. 3a where guide slot 68 has been ramped or slanted with respect to the axis of coupler tube 52 so as to force rotation of the coupler tube 52 simultaneously with linear displacement thereof and consequently rotation of the rotationally rigidly affixed valve shaft 12. The guide pin 62—slot 68 arrangement can function as a means for deriving a torque component from the axial force produced the drive shaft 50 in cooperation with the coupler 44 to thereby rotate the valve shaft 12 and the seal rings 16 within the valve bore 18. As is well known to those skilled in the art, the dynamic coefficient of friction between two surfaces is lesser than the static coefficient of friction between the same surfaces. A variation of this torque deriving means is shown in FIG. 13 where oscillatory rotation of the valve shaft is induced by a wave shaped slot 68' in bracket 89 corresponding to similarly numbered bracket of FIGS. 1–3.

The connection between the coupler tube 52 and the valve shaft 12 is rotationally rigid, i.e., rotation of the coupler 44 is transmitted to the valve shaft 12 even prior to driving engagement of the upper or lower coupler limits to initiate linear displacement of the valve shaft 12. Thus, the torque deriving means of this invention will commence rotation of the valve shaft, and consequently, rotation of the O-ring seals 16 relative to the wall 19 of the valve bore 18 prior to attempting axial movement of the valve shaft. As a result, the coefficient of friction between the O-ring seals and the valve bore wall 19 is reduced and less axial force is required to effect valve shaft movement once driving engagement of the coupler 44 and the valve shaft 12 takes place. The possibility of damaging or tearing off of the seal rings 16 is also reduced extending the serviceable life of the valve 10.

A second embodiment of the invention is shown in FIG. 8 where the drive shaft 250 is radially offset and parallel to the valve shaft 212, and the coupler 244 is connected transversely therebetween.

The drive shaft 250 has an intermediate threaded portion 262 and an upper and a lower non-threaded portion 280 and 282, respectively. As best seen in FIG. 9a, coupler 244 comprises a transverse coupler body 252, including a top 256, a bottom 257 and a pair of sidewalls 258 and 258', defining a rectangular channel 255 extending perpendicularly to both drive shaft 250 and valve shaft 212. A threaded hexagonal nut 271 has a threaded bore 272 extending vertically through channel 255 between top 256 and bottom 257, the threading 272 being adapted to engage the drive shaft threading 262. The nut body 271 conforms closely to the inner dimensions of channel 255 so as to be slidingly captive therein and is movable towards and away from valve shaft 212. A pair of oppositely aligned slots 273 and 274 are formed in the top 256 and bottom 257, respectively, near the first end 275 of coupler body 252 to expose the vertical bore 272 so that when the drive shaft 250 is threaded therethrough, both the nut 271 and shaft 250 are jointly slidingly movable within channel 255. Near the second, opposite end 276 of coupler body 252 are aligned vertical slots 277 and 277' formed in sidewalls 258 and 258' respectively, and an opening 254 defined in bottom 257 for accepting the upper end 224 of valve shaft 212. A transverse retaining pin 226 is secured to valve shaft 212, as by passing through a bore 213 formed therein, and extends through a aligned slots 277 and 277' to form a rotationally rigid but vertically floating assembly or connection with coupler body 252. The preferred transverse coupler 244 is thus radially collapsible, since the radius between the valve shaft and the drive shaft is variable by sliding the nut body, but it is tangentially rigid in that lateral movement of the nut body 271 against side walls 258, 258' will cause rotation of the valve shaft 212. Pin 226 may float between upper limits 296 and lower limits 298 defined by slots 277, 277' which are functionally equivalent to the upper limit 96 and the lower limit 98 defined by openings 94 in coupler tube 52 of FIGS. 1–3 and 9.

The embodiment of FIGS. 8 and 9a also includes upper and lower stop means similar in structure and function to the upper and lower stop means 95 and 97 of FIGS. 1–3. Specifically, the upper stop means in FIGS. 8 and 9a are defined by lower edges 295 of upper arms 291 and 291', and the lower stop means are defined by upper edges 297 of lower arms 293, 293', all arms being supported by bracket 289 which is secured to a portion of the valve body 220 or drive housing 240 so as to be fixed relative to the valve body 220. As previously explained, the purpose of upper and lower stop means 295 and 297 is to stop pin 226 to neutralize hydraulic pressure which would prevent re-engagement of the coupler 244 with the drive threading 262.

A lower spring means 284 is secured to coupler body 252 near first end 275 at 285 and stretches to a fixed anchor point 287 on drive housing 240 to urge reengagement of the transverse coupler 244 with the threaded portion 262 of the drive shaft 250 following disengagement therebetween at the lower non-threaded portion 282. An upper spring means is not shown but may be provided to exert a downward bias upon coupler 244 following disengagement thereof at the upper non-threaded portion 280.

Figure 10:
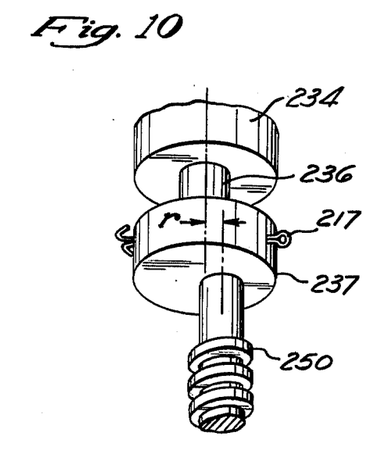
FIG. 10 shows an eccentric mounting of the drive shaft to the gear train output shaft.

FIG. 10 of the drawings illustrates a radially offset mounting of the drive shaft 250 of FIG. 8 to the output shaft 236 of the motor drive 234. A preferred method of mounting is by a transverse pin 217 passing through aligned bores in the drive shaft 250 and in an enlarged terminal mounting cylinder head 237 formed at the lower end of output shaft 236. (It has been found that some eccentricity is obtained without actual offset mounting due to inherent play in the gear drive and elastic deflection of the drive shaft under load conditions.) This radial offsetting of the drive shaft operates as a torque deriving means in conjunction with the transverse coupler 244 of FIG. 9a as explained below. The radial offset of drive shaft 250 with respect to output shaft 236 is preferably lesser than the radial offset between the drive shaft 250 and the valve shaft 212, as illustrated in FIG. 11.

Figure 11:
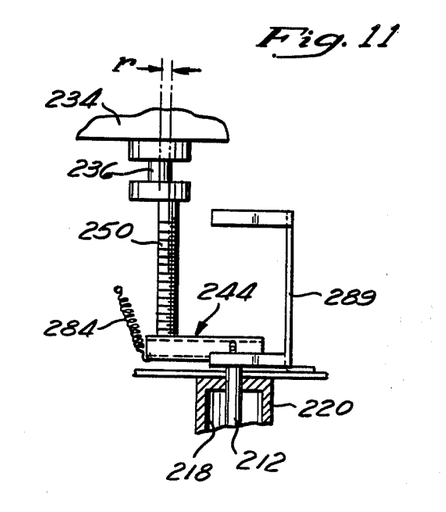
FIG. 11 is a side elevational view of an offset shaft drive including the eccentric drive shaft of FIG. 10.

The offset drive shaft of FIG. 10 is incorporated in the drive of FIGS. 8 and 9 as shown schematically in FIG. 11. The drive shaft is connected to the motor drive 234 as in FIG. 10 so that the drive shaft 250 is radially offset by a radius $\gamma$ with respect to the output shaft 236 and is parallel thereto. Thus, the longitudinal axis of the drive shaft 250 moves in a circle about the center of the drive shaft 236 to describe a cylinder upon being driven by motor drive 234. This circular movement is transmitted to the nut 271 of transverse coupler 244 in FIGS. 8 and 9a where the circular movement thus imparted to nut 271 is decomposed into a radial vector which only results in reciprocal linear movement of the nut 271 within channel 255 and which linear movement is not transmitted to the valve shaft 212, and into a tangential vector with respect to the valve shaft 212, i.e., a force vector acting alternately against each of the side walls 258, 258' which operates to oscillate coupler 244 through an arc of circle which is determined by the distance $\gamma$ of FIGS. 10 and 11. The angular oscillation of coupler 244 is transmitted through the rotationally rigid coupling formed by pin 226 passing through aligned slots 277, 277' to cause rotational movement of the valve shaft 212 within bore 218 of valve body 220 to diminish the coefficient of friction between the seal rings and the wall of the valve bore, as has been explained.

Figure 12:
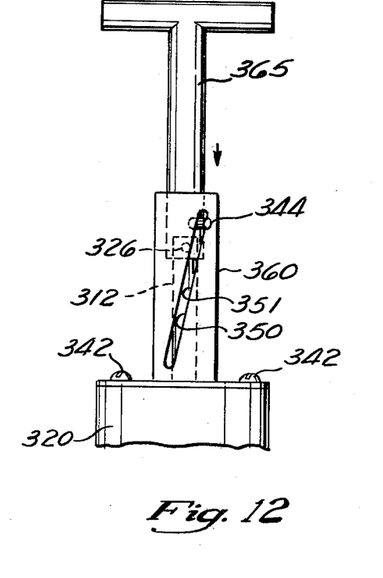
FIG. 12 is a partial view of the upper part of a hand operated up-down valve showing the connection of the handle to the valve stem in phantom lining and provided with a torque deriving means of this invention.

FIG. 12 partially shows the upper end of a manually operated up-down valve of standard construction to which has been added a torque deriving means of this invention comprising a guide pin 344 and a ramped slot 350 formed in cylindrical sleeve 360 mounted concentrically with the valve shaft 312. As the handle T-bar 365 is pushed downwards, pin 344 will be forced to pivot about the axis of valve shaft 312 in order to descend along the inclined plane defined by the ramped edge 351. Pin 344 will thus cause the shaft 312 to rotate thereby facilitating operation of the valve by reducing the coefficient of friction therein, as has been explained.

FIG. 12 is also illustrative of the ease with which a standard manually operated valve in a pre-existing installation may be converted to automatic operation by installation of the valve drive of this invention. The conversion merely requires removal of the T-bar handle 365, which is secured by transverse pin 326, and attachment of a valve drive unit such as drive 30 of FIG. 1 by means of existing screws 342 to valve body 320 and reinsertion of retaining pin 326 to make the floating connection with the coupler 44. The choice between the colinear coupling of FIGS. 1-3 and the radially offset coupling of FIGS. 8, 9a and 11 will depend on the type of valve because some have a short length of shaft travel which is better suited to colinear coupling, while other valves requiring longer lengths of shaft displacement are more conveniently coupled to the offset drives. The valve drive 30 is further provided with a cam timer motor 28 of conventional design which rotates five cams 27a, 27b, 27c, 27d, 27e on a common shaft each of which controls an electric switch 29a, 29b, 29c, 29d and 29e as shown in FIG. 1.

Figures 6, 7:
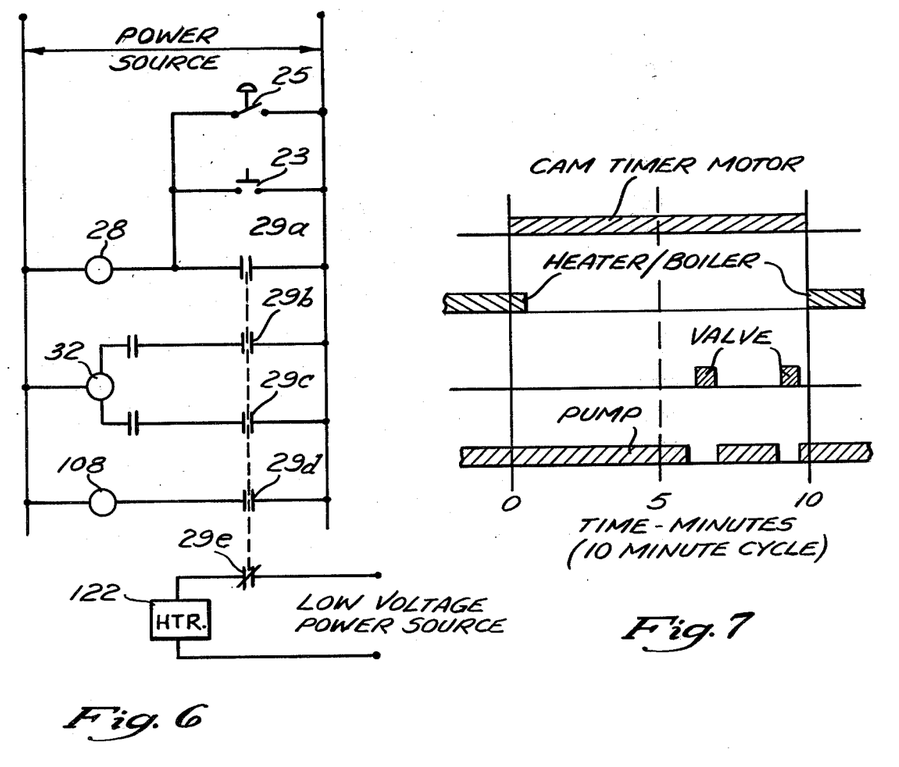
FIG. 6 is a schematic diagram of cam timer switching controls.
FIG. 7 is a diagram showing the sequence of operations controlled by the timer control of FIG. 6 in the course of one backwash cycle.

The electrical schematic of FIG. 6 depicts the control functions of the timer motor and cam switch arrangement. The normally open switch 29a controls the current supply to the cam timer motor 28. Once the cam timer motor is started either by means of manual switch 23 or by fluid pressure sensor switch 25 suitably mounted to a fluid conduit as in FIGS. 4 and 5, cam 27a will close switch for the duration of a backwash cycle, e.g., 5 to 10 minutes, and timer motor 28 is activated until the sequence of operations is completed. Switch 29b controls power to valve motor 32 in one direction while switch 29c applies power to valve motor 32 for movement in the opposite direction. Thus, one switch will cause upward movement of the valve shaft 12, while the other switch will cause the shaft 12 to be pushed down. Switch 29d controls power to pump 108 in FIGS. 4 and 5. Switch 29e is normally closed and is opened by cam 27e to interrupt power and shut-off the heater 122 of FIGS. 4 and 5.

The sequence of operations controlled by the cam timer motor and associated switches is shown in FIG. 7 as a function of time. In a normal initial condition, at time 0 both the heater/boiler 122 and the pump 108 are operating. The backwash cycle is commenced either by manually depressing switch 23, or automatically, by sensor 25 which is triggered by an increase in fluid pressure due to filter clogging, or by sensing a reduction in the fluid flow rate due to the same reason. Thus, at time 0, the cam timer motor 28 is activated and runs for the full 6 to 10 minute cycle. Shortly after commencing the cycle, the heater/boiler 122 is shut down by opening switch 29e while the pump remains in operation for a few minutes to circulate fluid until the heating elements in the heater/boiler have cooled down. Then, the pump 108 is shut down by means of switch 29. Following shut off of the pump 108, the valve drive motor 32 is activated by one of switches 29b or 29c, depending on the required direction of movement, to slide the valve to its occasional or backwash position and drive motor 32 is then shut off. The pump 108 is reactivated to circulate fluid through the filter and effect the actual backwashing, following which the pump is again shut off. Valve drive motor 32 is reactivated by the other of switches 29b or 29e and the valve shaft is returned to its normal position. The pump is again started and, preferably, after a short time to establish circulation of fluid, the heater/boiler is again started returning the system to normal operation. It is understood that the electrical switching may be effected by power relays which, in turn, are controlled by the cam activated switches 29a-e.

Pump shut-off is an important step in the backwash cycle and a material element in the timer control used herein. In the past, it was necessary to shut off the pump manually during the backwash cycle and consequently, the step was often omitted resulting in damage to the valve or pump or both. Further, it is desirable to cool off the heater prior to reversing the direction of fluid flow to avoid running heated fluid through the valve and the filter medium. This desirable and relatively complex sequence is performed reliably by the cam timer motor.

In some installations such as large fish tanks or ponds, it is desirable to add a fail-safe feature to the timer control system of FIG. 6 that will shut off the pump 108 if the backwash cycle exceeds a predetermined time, e.g., due to failure of the valve drive motor 32 or associated components. This safety feature will prevent complete draining of the fluid body 106 in the event of such failure.

It is understood that many changes are possible to the structure here disclosed without departing from the spirit and scope of the invention as defined in the appended claims.

For purposes of the appended claims, substantive rotation of the coupler means is defined as less than 360° of coupler rotation for each 720° of drive shaft rotation.

I claim:

1. A valve drive for a vertical up-down valve having a shaft with one or more seal rings affixed thereto, said shaft being axially movable within a cylindrical valve bore between a normal valve position and an occasional valve position comprising:
   a motor drive,
   a threaded rotatable, normally vertical drive shaft operatively connected to said motor drive;
   threaded coupler means coupling said drive shaft to said valve shaft for exerting axial force thereon to thereby linearly move said valve shaft; and
   said threaded drive shaft being provided with an upper and a lower non-threaded portion, said threading being formed on a drive shaft portion intermediate said non-threaded portions and corresponding in length to the linear movement of said valve shaft between said normal and said occasional valve positions to thereby precisely limit said linear movement of said coupler means and said valve shaft by disengagement of said threaded coupler means from said threaded portion of said drive shaft irrespective of rotation of said drive shaft.

2. The apparatus of claim 1 further comprising:
   spring means urging said coupler means towards re-engagement with said threaded drive shaft portion upon disengagement of said coupler from said threading.

3. The device of claim 1 wherein said coupler means is loosely connected to said valve shaft such that said valve shaft is free to float under hydraulic pressure between a fixed upper limit means and a fixed lower limit means formed in said coupler and is drivingly engageable by said upper and lower coupler limit means for axial movement thereof.

4. The device of claims 1 or 3 further comprising upper stop means and lower stop means for restraining said valve shaft against hydraulic pressure following disengagement of said coupler means from said threaded drive shaft portion at said upper and lower non-threaded portions.

5. The device of claims 1, 2, 3 or 4 wherein said coupler means is colinear with said drive shaft and said valve shaft.

6. The device of claims 1, 2, 3 or 4 wherein said coupler means comprises a first end provided with threaded means for receiving said threaded drive shaft, a second end adapted to receive said valve shaft, a pair of transversely aligned apertures formed in said coupler means and a retaining pin secured to said valve shaft and extending through said aligned apertures transversely with respect to said valve shaft, said apertures being oversized relative to said pin to form a floating connection with upper and lower fixed limits defined by the rims of said apertures.

7. The device of claims 1 or 6 wherein said coupler means engages said drive shaft colinearly with said valve shaft.

8. The device of claims 1 or 6 wherein said drive shaft and said valve shaft are radially offset from each other and said coupler means is transversely connected therebetween.

9. The device of claim 1 further comprising:
   means for deriving a torque component on said valve shaft during linear movement thereof to thereby rotate said valve shaft and said one or more seal rings within said valve bore during linear movement of said valve shaft to thereby reduce the coefficient of friction between said one or more seal rings and said valve bore.

10. The valve of claim 9 wherein said means for deriving a torque component comprises a guide pin secured at one end to said coupler means, the other end being contained within a ramped guide slot formed in a bracket fixed relative to said valve bore so as to cause rotation of said valve shaft during vertical displacement of said coupler means.

11. The valve of claim 10 wherein said guide slot is wave-shaped to thereby cause oscillation of said valve shaft about its axis during vertical driving movement of said coupler.

12. The valve of claim 1 wherein said motor means is an electrical motor driving said drive shaft through a train of speed reduction gears.

13. The valve of claim 1 further comprising position sensing switch means for interrupting power to said electrical motor upon said valve shaft completing movement between said normal and said occasional positions.

14. The valve of claim 13 wherein said switch means comprise first and second microswitches positioned at the upper and lower travel limits of a switch trip member connected to said valve shaft for tripping said microswitches to thereby interrupt power to said electric power.

15. The valve of claim 1, 3 or 8 wherein said coupler means further comprises a transversely extending coupler body connected to said valve shaft, a channel defined within said body, and a threaded nut held within said channel against movement in a direction coaxial with said drive shaft but linearly movable in a direction transverse to said valve shaft, said threaded nut being adapted to engage said threaded drive shaft.

16. The valve of claim 15 wherein said channel is perpendicular to both said drive shaft and said valve shaft.

17. The valve of claim 15 wherein said drive shaft is connected to said motor drive such that it is radially offset with respect to the output shaft of said motor drive, and parallel thereto whereby the axis of said drive shaft moves in a circle upon being driven by said motor drive which circular movement is transmitted to said movable threaded nut in said coupler where the circular movement is decomposed into a radial vector and a tangential vector with respect to said valve shaft, the radial vector resulting in reciprocal linear movement of said nut within said channel while said tangential vector operates to oscillate said coupler through an arc to cause rotational movement of said valve shaft within said valve bore.

18. The valve of claim 17 wherein the radial offset of said drive shaft with respect to said output shaft is lesser than the radial offset between said drive shaft and said valve shaft.

19. The valve of claims 1 or 3 wherein said drive shaft is radially offset with respect to said valve shaft and said motor drive further comprises an output shaft drivingly connected to said drive shaft such that said drive shaft is radially offset with respect to said output shaft, and radially collapsible tangentially rigid transverse coupler means affixed to said valve shaft and provided with thread means for engaging said threaded drive shaft.

20. The valve of claims 1 or 3 wherein said coupler means additionally comprises:
   a coupler body defining a rectangular channel having first and second ends, said body including a top, a bottom and a pair of sidewalls;
   a nut closely conforming to the inner dimensions of said channel so as to be slidingly captive therein, said nut having a threaded bore formed therethrough extending between said top and said bottom, oppositely aligned slots formed in said top and bottom mear said first end for exposing said threaded bore to permit said drive shaft to be threaded therethrough and for allowing joint sliding movement of said drive shaft and nut within said channel;
   aligned vertical slots formed in said sidewalls;
   an opening defined by said bottom for accepting said valve shaft into said channel; and
   a retaining pin secured to said valve shaft and extending through said aligned slots to form a rotationally rigid but vertically floating assembly with said coupler body.

21. In a vertical up-down valve having a shaft with one or more seal rings affixed thereto, said shaft being axially movable within a cylindrical valve bore between a normal valve position and an occasional valve position, said valve shaft extending through the upper end of said valve, a valve drive comprising:
   a housing having an apertured bottom wall adapted to be attached to said upper end;
   a motor drive mounted within said housing and having a downwardly extending output shaft;
   a drive shaft connected to said output shaft and having a threaded portion intermediate an upper and a lower non-threaded portion, said threaded portion corresponding in length to the linear movement of said valve shaft between said normal position and said occasional position;
   a threaded coupler means for engaging said drive shaft and being loosely connected to said valve shaft such that said valve shaft is free to float between a fixed upper limit and a fixed lower limit formed in said coupler and is drivingly engageable by said upper and lower coupler limits for axial movement thereof, the linear movement of said coupler along said drive shaft being limited by disengagement thereof at said upper and said lower non-threaded portions irrespective of continued rotation of said drive shaft;
   guide means preventing rotation of said coupler; and
   upper stop means and lower stop means for limiting the linear movement of said valve shaft short of said upper coupler limit in the valve up position and short of said lower coupler limit in the valve down position, to thereby keep said valve shaft from transmitting fluid pressure from within said valve bore against said coupler following disengagement of said coupler from said threaded drive shaft portion which pressure would prevent reengagement thereof with said threaded portion of said drive shaft.

22. The valve drive of claim 21, further comprising:
   spring means urging re-engagement of said threaded coupler with said threaded portion of said drive shaft.

23. The valve drive of claim 21 further comprising torque deriving means for rotating said valve shaft within said valve bore.

24. The device of claim 1 further comprising:
   guide means for restraining said coupler means against substantive rotation during linear movement of said valve shaft.

* * * * *